US010225901B2

(12) United States Patent
Liu et al.

(10) Patent No.: US 10,225,901 B2
(45) Date of Patent: Mar. 5, 2019

(54) PROGRAMMABLE LED DRIVER, MONITOR AND SETTING DEVICES

(71) Applicant: Fulham Company Limited, George Town (KY)

(72) Inventors: Shiyu Liu, Shanghai (CN); Xu Wang, Shanghai (CN); Jianwei Cao, Shanghai (CN); Alvaro Garcia, La Habra, CA (US); Kamran Sarmadi, Arcadia, CA (US)

(73) Assignee: FULHAM COMPANY LIMITED, George Town (KY)

( * ) Notice: Subject to any disclaimer, the term of this patent is extended or adjusted under 35 U.S.C. 154(b) by 0 days.

(21) Appl. No.: 15/144,718

(22) Filed: May 2, 2016

(65) Prior Publication Data

US 2017/0006683 A1    Jan. 5, 2017

Related U.S. Application Data

(60) Provisional application No. 62/156,271, filed on May 3, 2015.

(51) Int. Cl.
*H05B 33/00* (2006.01)
*H05B 33/08* (2006.01)
*H05B 37/02* (2006.01)

(52) U.S. Cl.
CPC ...... *H05B 33/0851* (2013.01); *H05B 33/0815* (2013.01); *H05B 33/0887* (2013.01); *H05B 37/0227* (2013.01); *Y02B 20/346* (2013.01)

(58) Field of Classification Search
CPC ............ H05B 33/0815; H05B 33/0818; H05B 33/0845; H05B 33/0848; H05B 33/0851; H05B 37/02; H05B 33/0857; H05B 33/0809; H05B 33/0833; H05B 33/0839; H05B 33/10; H05B 33/08; H05B 33/0812; H05B 33/0854
See application file for complete search history.

(56) References Cited

U.S. PATENT DOCUMENTS

2013/0293139 A1* 11/2013 Sadwick ................ H05B 37/02
                                                                  315/224

* cited by examiner

*Primary Examiner* — Monica C King
(74) *Attorney, Agent, or Firm* — Womble Bond Dickinson (US) LLP

(57) ABSTRACT

LED driver apparatus and methods may include a sensing circuit for adjusting an output based on either a pulse width modulation dimming control or an analog dimming control. An LED driver apparatus and methods may also include a sensor for a parameter such as temperature and for recording such parameter, for example as a function of time. A setting unit for an LED driver apparatus can be used to sense and/or adjust settings in the LED apparatus even when the LED apparatus is not independently powered.

4 Claims, 14 Drawing Sheets

Accessories

Type I output wire, corresponding to 3.5mm pitch of the LED driver's connector:
1. connect to setting box;
2. connect to driver Type II output wire, corresponding to 5mm pitch of the LED driver's connector:
1. connect to setting box;
2. connect to driver Adapter, used for lead-wire-exit LED driver:
1. connect to driver;
2. connect to Type II output wire

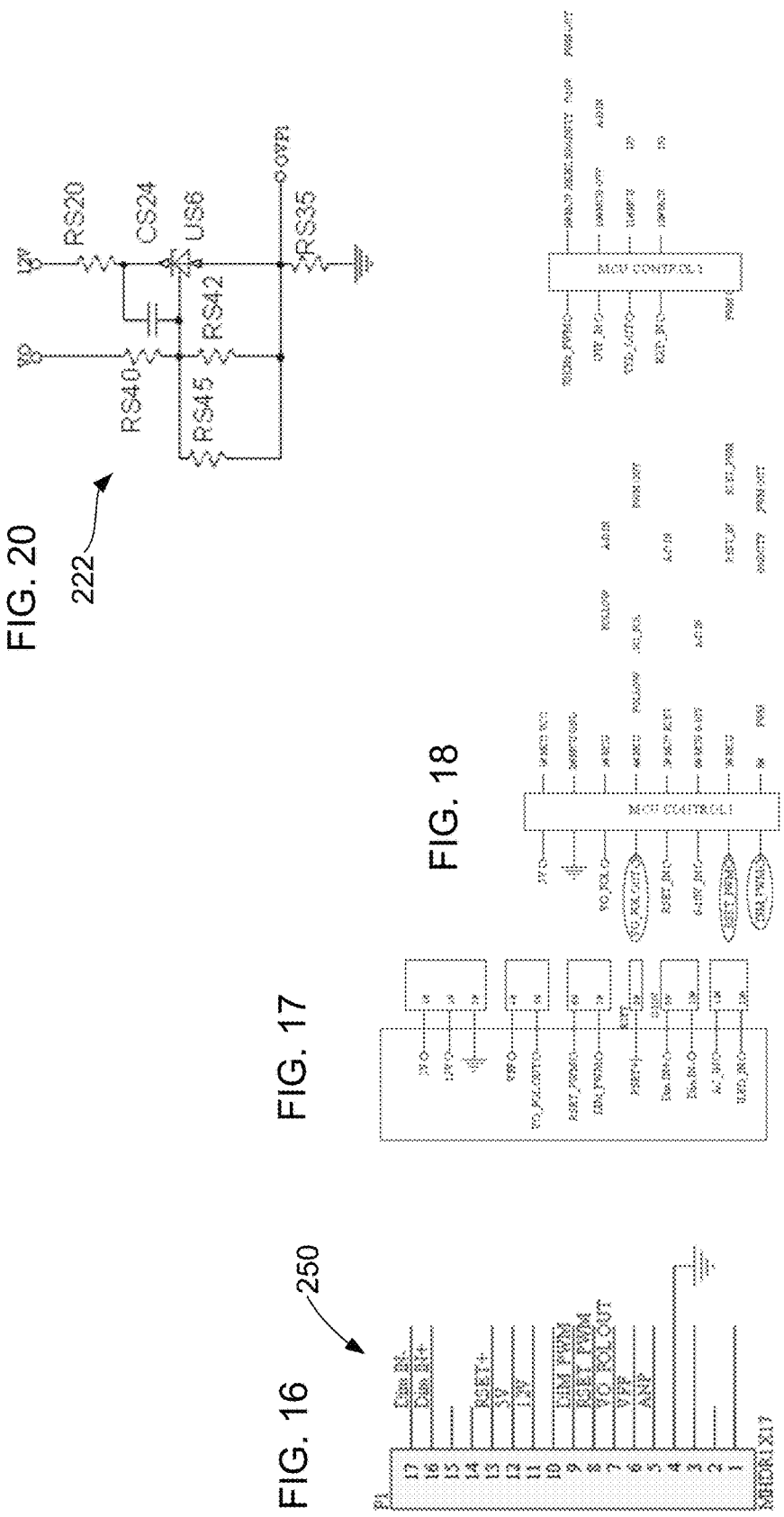

PROGRAMMABLE LED DRIVER, MONITOR AND SETTING DEVICES

CROSS REFERENCE TO RELATED APPLICATIONS

This application is a non-provisional of and claims priority to U.S. Provisional Patent application 62/156,271 filed May 3, 2015, incorporated herein by reference.

BACKGROUND

Field

These inventions relate to LED drivers, including programmable ones, monitoring methods and apparatus for LED drivers, and methods and apparatus for setting, changing and/or communicating with LED drivers.

SUMMARY

Apparatus and methods are disclosed which separately and independently may be used to improve LED drivers and/or methods of using and configuring such drivers. Additionally, two or more of the apparatus and/or methods can be used together for additional benefit.

In one example herein, methods and apparatus are described for sensing temperature of an LED driver, a driver component, or an LED lighting system, including ones for sensing temperature as a function of time. In one configuration, temperature is recorded over time and stored on the device, for example on a microprocessor (as used herein, MCU means microprocessor control unit, or more generically, microprocessor), memory or storage unit, or combination thereof. In one example, temperature is recorded as a function of time. In a further example, stored or recorded temperature information is retrieved from the driver or lighting apparatus and analyzed, for example for temperature extremes, temperature profiles, including temperature profiles as a function of time, integrated temperature, and the like, and/or temperature ranges. Such information can be evaluated for estimating actual LED lifetime, for example for warranty information, research and development, and the like.

In another example of methods and apparatus for sensing temperature of LED driver, driver component or LED lighting system, a temperature sensing component, for example a thermistor or other electrical temperature sensing component, can be mounted on or integrated into a printed circuit board for sensing and communicating the sensed temperature information, for example, as a function of time. The component can be positioned in the device at a representative location, for example in an area likely to reflect average temperature variations for the equipment, for example at locations other than those having extreme temperature variations not reflecting actual temperature of an LED array during its operation.

In a further example of methods and apparatus for sensing temperature of LED drivers, driver components or LED lighting systems, a temperature sensing component can be positioned on or adjacent the equipment and configured to communicate the sensed temperature information, for example as a function of time, to a storage device or other receiving component.

In another example of a device that helps maintenance and operation of LED drivers, an apparatus is provided that adjusts settings or values of electrical components in the driver. In one example, apparatus and methods are provided for changing a resistance value in a driver circuit. In one configuration, a driver includes a connector or other interface for connecting an external component to the driver. For example, the external component can be a passive resistor. In another example, the external component can be a digital device for changing or setting a value or register or other component of a digital device on the driver. The digital device can be temporarily connected to the driver, for example until such time as a confirmation is received by the digital device, or by making a transient connection, for example in the range of 1-5 seconds or 1-10 seconds. In a further example, a general-purpose digital device, such as a computer, laptop, or the like, which includes an application for modifying, changing or setting a digital component on the driver may interface with the driver. Such changes with an external component or external device can have a number of purposes, including, for example, changing an output current of the driver, changing a voltage on the driver, or for uploading or downloading data.

In another example of using an external device for changing a driver, for example an LED driver, and for example to change a setting, upload or download data, or a change in output, an external digital device for temporarily connecting to the driver can have either an internal power supply, for example batteries, or an external power supply, for example a USB or other connection, or both. For example, a digital device can be coupled to a USB port, for example on a computer, or a power converter, which is then used to power the external device. The external device can be used as described above in the immediately preceding paragraph.

In another example of improved methods and apparatus for operating an LED driver, the driver includes an external connection for receiving a device for changing a setting in the driver. For example, the connector can be one having at least two pins for receiving a passive resistor. In another example, the connector can be one having at least two pins for receiving a complementary connector from a temporary digital device for changing a parameter or component of the driver.

In another example of an improved method and apparatus for operating an LED driver, a driver can include a circuit for receiving a low-voltage signal and producing a higher voltage signal for operating a component of the driver. The higher voltage-producing circuit can be isolated from another portion of the driver circuit. For example, isolation can occur by a transformer.

In a further example of an LED driver, a powering circuit can be provided for powering a microprocessor of a driver circuit through a connector coupled to an external device so that the microprocessor can be modified, set, or otherwise accessed by an external device without the driver being powered up. In one example, a low-voltage can be applied through a connector on the driver from an external device, for example a handheld setting device, a tablet computer, a general-purpose computer or other external devices.

In another example of an LED driver, a higher voltage power supply can be provided for powering one or more circuits in the driver. In one example, a power switching power supply can be coupled to a secondary circuit for supplying higher voltage power to the secondary circuit. The power supply can be separated from the secondary circuit or isolated therefrom by an isolation device such as a transformer. The power supply can be used to power a secondary circuit such as a dimming circuit.

In a further example of an LED driver, the driver can include a dimming circuit. In one example, the dimming circuit includes enhanced accuracy, for example dimming over a range between 1% and 100%. The driver can also include an automatic detection and switching configuration for switching between analog dimming and pulse width modulation (PWM) dimming. A dimming circuit can be provided that has reduced flicker. The dimming circuit can be combined with a buck circuit to reduce output ripple current, and reduce flicker. Additionally, a circuit combination can be provided for which the PWM dimming signal is synchronized with a buck circuit at substantially the same operating frequency.

These and other examples are set forth more fully below in conjunction with drawings, a brief description of which follows.

BRIEF DESCRIPTION OF THE DRAWINGS

FIG. 1 is a schematic and block diagram of an LED lighting assembly and input power, and possible accessory or supplemental components any or all of which can be used there with.

FIG. 16 is a schematic of an alternative connector or a junction for use in the circuits of FIGS. 11 and 12.

FIG. 17 is a functional diagram of microprocessor pins for use with the circuits of FIGS. 11 and 12.

FIG. 18 is a functional diagram of processor pin designations for a main processor and a secondary processor for use with the circuits of FIGS. 11 and 12.

FIG. 20 is an electrical schematic of an overvoltage protection circuit for use in a driver such as those described herein.

DETAILED DESCRIPTION

Figure 1:
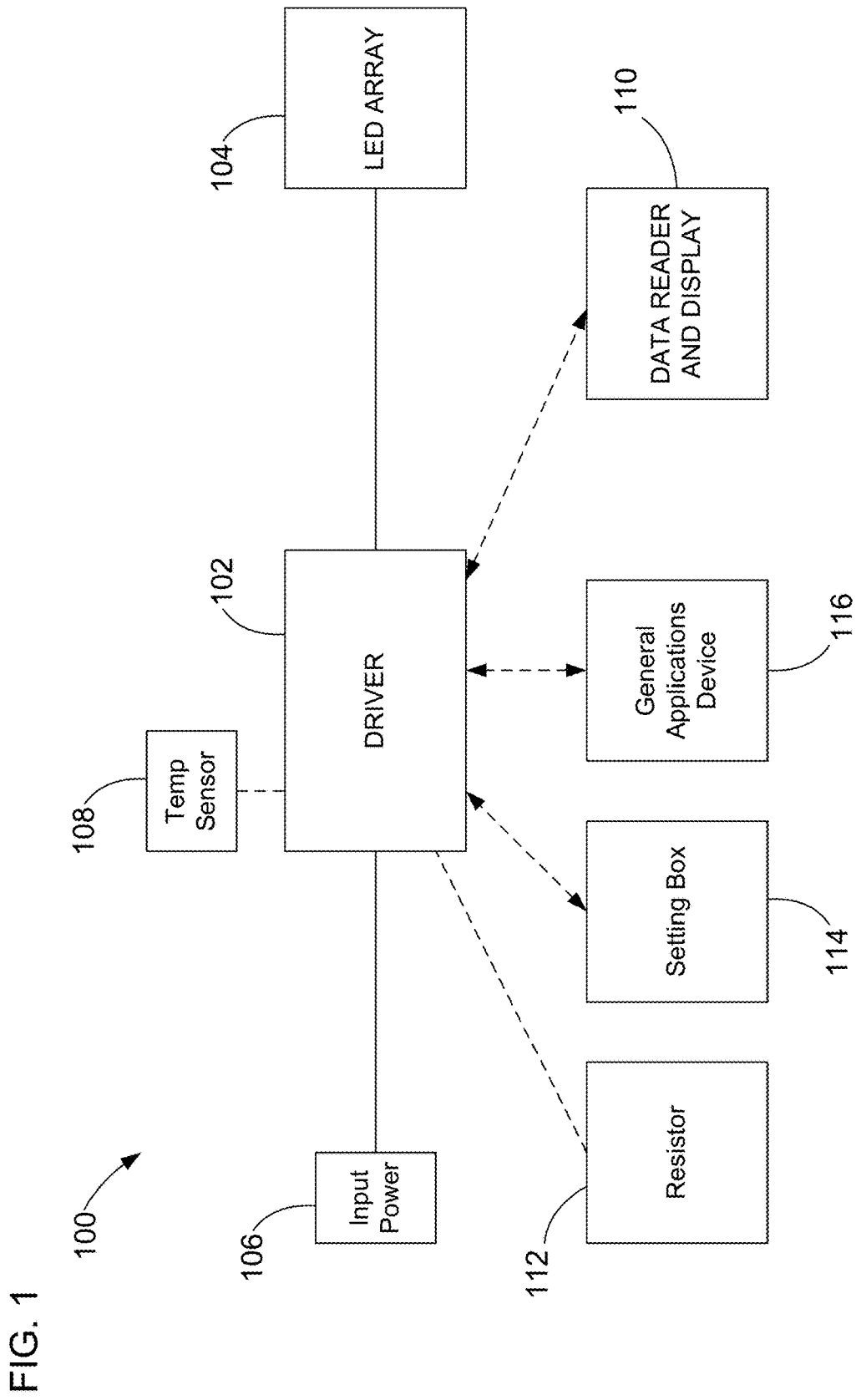
Figure 2:
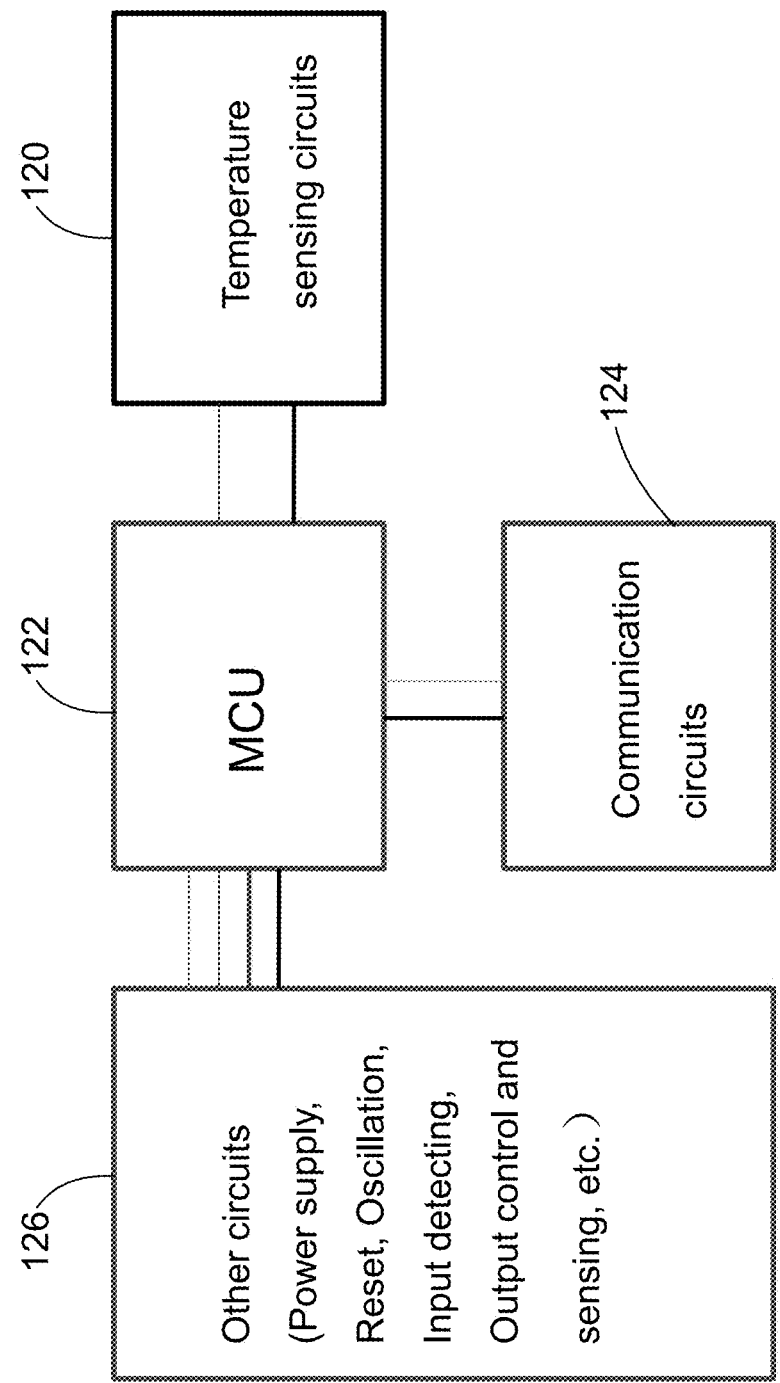
FIG. 2 is a block diagram of an LED driver including a temperature monitoring configuration.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of LED drivers and of methods of making and using the LED drivers are described. Depending on what feature or features are incorporated in a given structure or a given method, benefits can be achieved in the structure or the method. For example, LED drivers can be more easily managed, and are more versatile. More reliable information regarding operation of an LED driver and/or LED lighting assembly, including temperatures during operation, can be obtained, stored and processed as desired.

These and other benefits will become more apparent with consideration of the description of the examples herein. However, it should be understood that not all of the benefits or features discussed with respect to a particular example must be incorporated into a LED driver, component or method in order to achieve one or more benefits contemplated by these examples. Additionally, it should be understood that features of the examples can be incorporated into a LED driver, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of LED driver configurations and of methods of making and using the LED drivers are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

As used herein, "substantially" and "approximately" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Apparatus and methods are described for assembling, configuring and using LED drivers and various accessories and components with such drivers. While a number of combinations of components and functions are described herein, any one or more can be used in or with a driver without using each of the others and still achieve benefits of such sub combinations. Therefore, even though a number of components and functions are described together, opponents and/or functions can be omitted or substituted with one or more other components and/or functions similar to those described herein.

A lighting assembly 100 (FIG. 1) can include a driver 102 coupled to an LED array 104 for driving the array. The driver is powered by a suitable input power 106 during normal operation, which input power may be typical mains power, or in backup mode may be battery power, or other means of powering the driver 102. Examples of drivers are described herein, but it is understood that conventional LED drivers can be modified for use with one or more accessories or external components described herein. In one example, a temperature sensor 108 can be included in or coupled to the driver for sensing the temperature of a component to which it is mounted or in contact, or for sensing the temperature of the surrounding environment. In one configuration, the temperature sensor can be coupled to circuits in the driver for receiving temperature data, and for storing the temperature data for later use, analysis or transferred to another device. The temperature data can be recorded as a function of time, and the temperature and time data saved, analyzed or transmitted to another device.

The driver 102 can also be removably or permanently coupled to a data reader, communications and/or display device 110. The device 110 can read data, for example temperature data, from the driver. Alternatively or additionally, the device 110 can communicate with the driver and transmit and/or receive data, instructions, or settings. The device 110 can also display any of the foregoing, and such bi-directional communication can take place without the need to apply input power to the driver.

The driver 102 can also be programmed, configured, set or otherwise modified for a desired configuration/operation. In one example, the driver can include an external connector or junction (described more fully below) that can receive an electrical component 112 for changing, setting or otherwise configuring the driver as desired. In one example, the electrical component is a passive resistor for changing the driver configuration. For example, the resistor can be used to change the normal output current for the driver. Such a combination may be useful for a current mode driver. Similar adjustments and/or changes can be made with voltage mode drivers. Additionally, it is understood that many of the circuits and accessories or external devices described herein in the context of a current mode driver are also applicable to voltage mode drivers, with modifications understood by one skilled in the art based on the discussion herein.

In another example, the driver 102 can be programmed, configured, set or otherwise modified for a desired configuration/operation by temporarily or permanently attaching or linking (for example wirelessly) an external device to the driver. In one example, a setting box 114 may be attached or linked to the driver 102 for changing, setting, configuring, or transmitting or receiving data from, the driver. In one example described herein, the setting box is a handheld digital device, and may include a keypad, selection buttons or input components, and/or programming components with or without a display or other communications or user interface components (for example audible or visual indicators). Data that can be transmitted to the driver may include data tables, setting values, and the like. Data that can be received from the driver may include operating data, error log information, sensor information such as temperature information from a temperature sensor, and the like.

In a further example, the driver 102 can interface with a general applications device 116 in the same or similar manner to that described with respect to the external device 114. The general applications device may be a computer, tablet or other programmable device. The device may include an application for interfacing with the driver 102. As with the external device 114, the general device 116 can be temporarily or permanently linked or connected with the driver.

These and other apparatus and methods are described in more detail below.

The driver can be associated with a data collection or sensing component, for example hardwired or wirelessly linked to the driver, and in the present example the driver includes temperature sensing circuits 120. The temperature sensing circuits are coupled to a processor 122 for the driver, to which is connected or linked one or more communication circuits 124. The communication circuits allow data, instructions, settings, or firmware, among other things, to be communicated with the processor for the driver. As used herein, MCU refers to a microprocessor control unit, or more generically a microprocessor or processor. In the present examples, the processor can be any number of processors that can be used with LED drivers and similar components. The processors include conventional structures and functions, including a clock circuit, registers and memory components and the like. Processors may be relatively simple or more complex, depending on the features and functions desired. Several examples are identified herein. In the present example, the driver includes additional circuits 126 used for producing output current for driving an LED array. Such other circuits include a power supply, reset components, oscillation circuits, input detection, output control, sensing, and the like.

Figure 3:
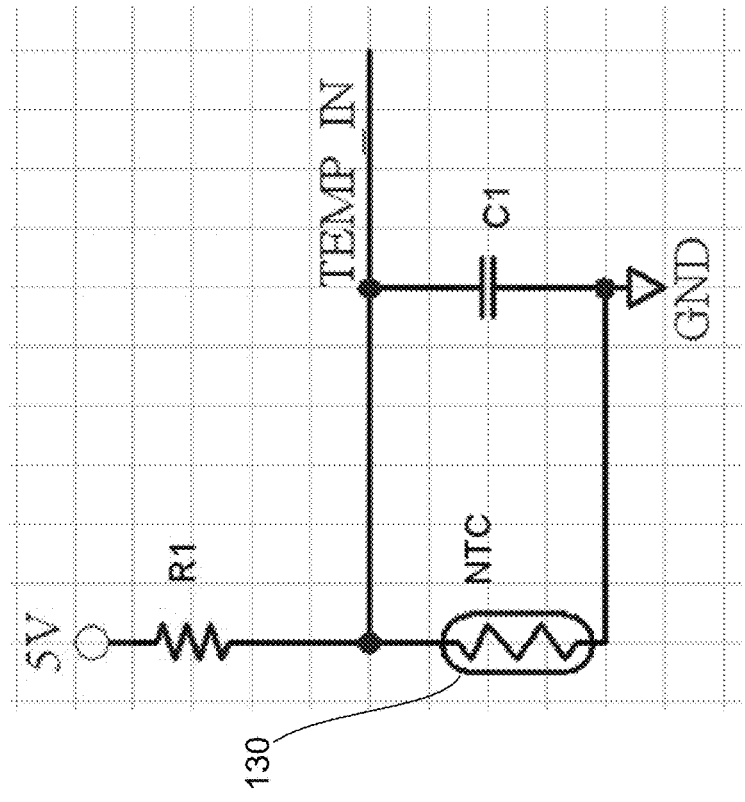
FIG. 3 is a schematic of a portion of an LED driver circuit that can be used for monitoring temperature and communicating a signal representing temperature to another portion of the LED driver circuit, for example a microprocessor and/or memory.

In one example, the temperature sensor is a thermistor 130, in the present example a negative temperature coefficient thermistor. Other temperature sensing components can be used. The thermistor is coupled in parallel in this example to a capacitor C1 shown in FIG. 3 and is coupled to a resistor R1 of FIG. 3 to a power supply, and the other end to ground. The thermistor voltage is applied to the Temp In pin of a processor for receiving, recording or otherwise processing the signals representing temperature, in the present examples as a function of time.

Figure 4:
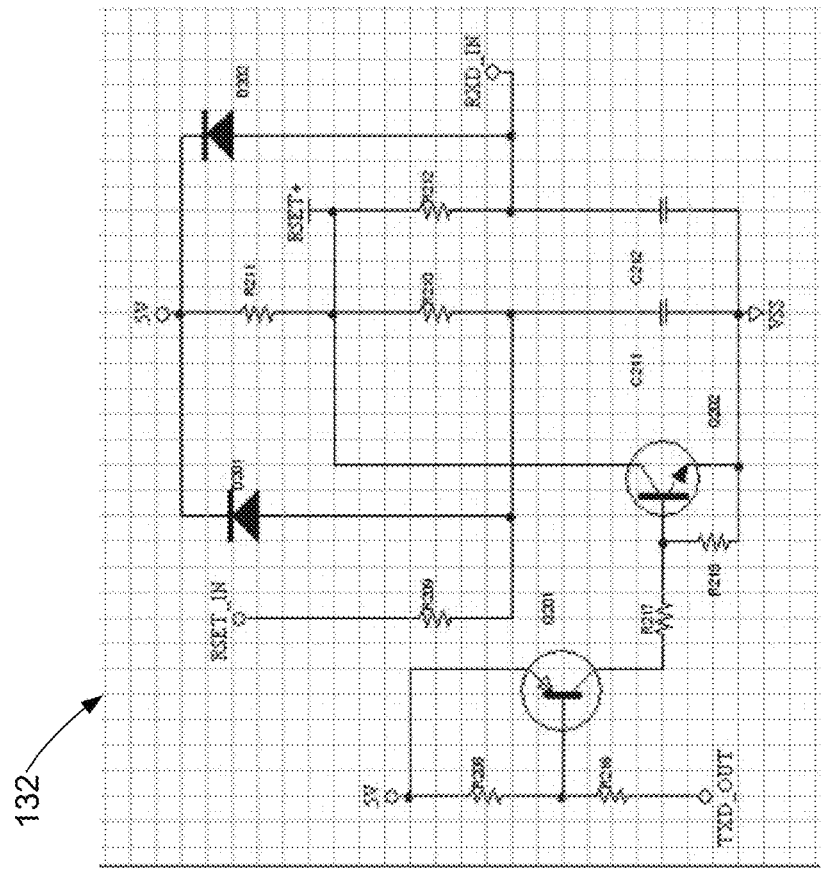
FIG. 4 is a schematic of a communications circuit for use with an LED driver for communicating information between the LED driver and an external device.

The driver may also include a communication circuit 132 (FIG. 4) coupled to the microprocessor for sending and receiving signals, such as data, instructions, settings, and the like as described herein and as would be apparent to one skilled in the art. In the present example, the communications circuit is coupled to the RXD_In processor pin and to the TXD_Out processor pin. The communications circuit 132 is also coupled to the processor by way of the RSET_In node. In the present context, RSET_In refers to RSET In or Resistor Set In, and not "reset". Additionally, the label described herein RSET_PWM, RSET+, and similar refer to Resistor Set PWM, etc.

Figure 5:
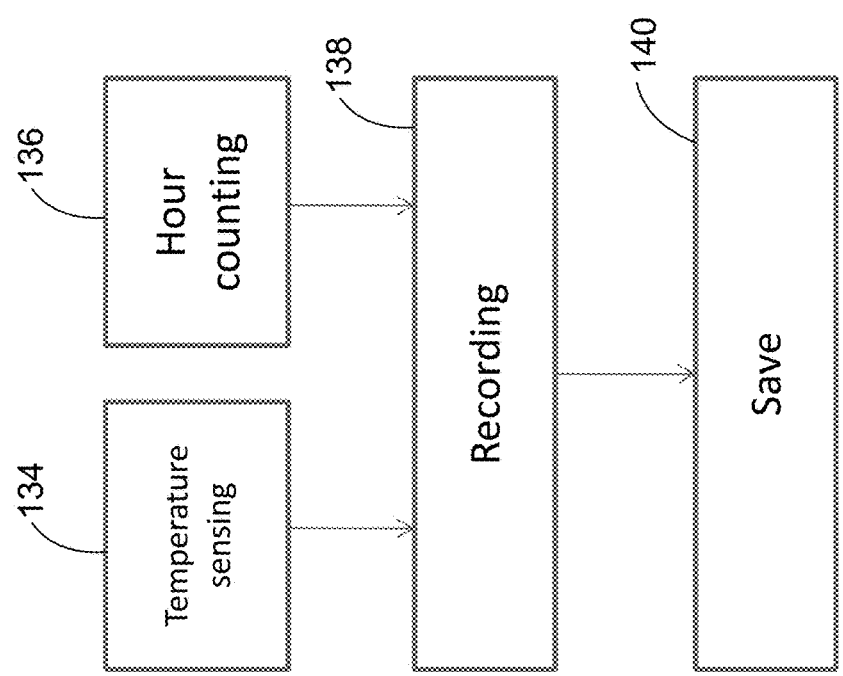
FIG. 5 is a block diagram representing a method of monitoring temperature and recording information regarding temperature, including over time.

In the present example, the present driver is configured to sense temperature and send signals representing the sensed temperature to the processor for storage and/or communicating to an external device. The processor combines the temperature data with clock or timing data for correlating the sensed temperature with time during operation and/or with other data to be correlated with the temperature. For example, as represented in FIG. 5, the driver assembly carried out temperature sensing 134 while also recording time 136 using the system clock or other appropriate timer. The data from the temperature sensor and the clock are recorded 138, and saved 140, for example in memory, which will typically be on the driver. However, it is also understood that such data can be transmitted simultaneously or after a delay to an external device.

Figure 6:
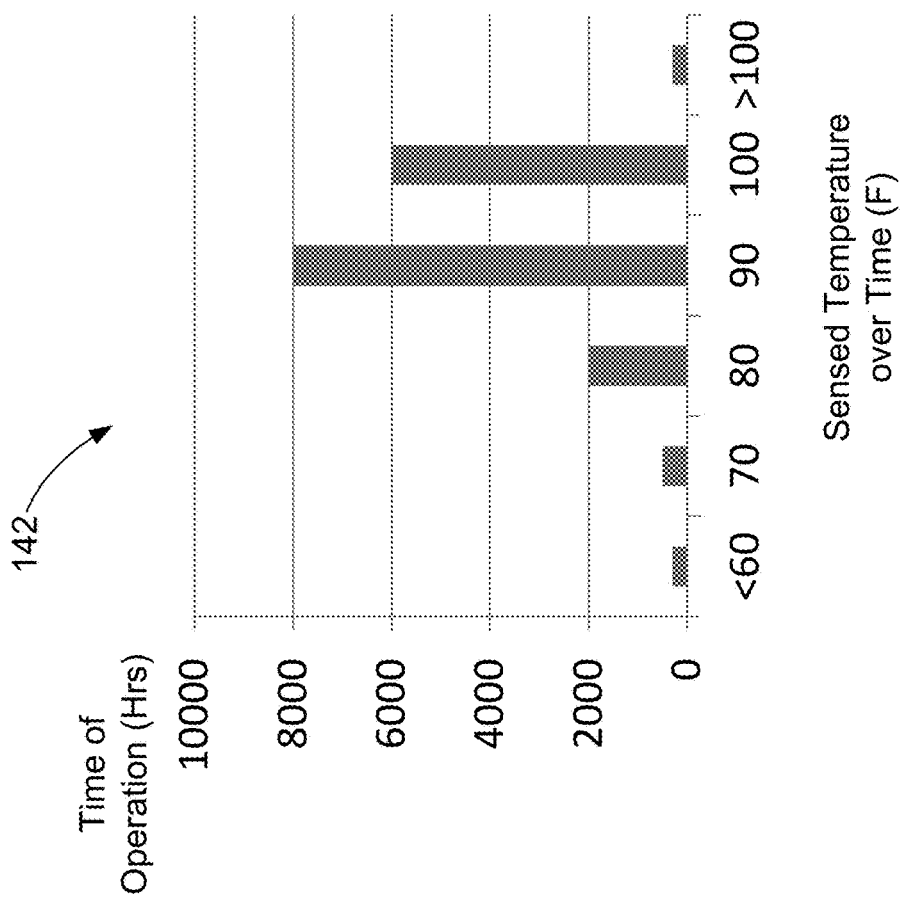
FIG. 6 is a graph showing accumulated hours versus temperature, showing a total for a number of hours of sensing at various temperatures wherein temperatures are aggregated over 10° blocks, and plotted for the length of time over the lifetime of the product that the respective temperature block was sensed.

The temperature and time data can be processed, for example in the driver or in an external device, and for example in real time or at selected intervals or upon command, or at the driver end-of-life. In one example, the data can be accumulated and analyzed as a function of time, for example the amount of time that the thermistor sensed a given temperature or a given temperature range or a temperature block, and such information can be evaluated to determine possible effects on driver and/or LED array lifetime. In one example shown graphically in FIG. 6, a bar graph 142 displays on the y-axis total hours of operating time as a function of temperature along the x-axis. In the illustrated example, a given bar corresponds to a 10° temperature block, for example 60-69°, 70-79°, and so on. In the present example, each bar represents the total amount of time that the thermistor sensed temperatures within the temperature block. The time is given in hours. By way of example, the bar graph 142 shows that the driver or components adjacent the thermistor were operating in the 80° temperature block for 8000 hours, and in the 90° temperature block for 6000 hours. Additionally, adding up the total number of hours for each of the bars will represent the total operating time for the driver. The data can then be used, either by the driver or an external device or user to estimate the effect of temperature on the actual lifetime of the driver, for example compared to the anticipated lifetime when the driver was first installed, namely the operating life, and if the temperature information is processed before the end of the driver life, the data may also be used to anticipate or more accurately predict the anticipated end-of-life for the driver assuming the operating conditions remain the same. Such information may be useful for warranty purposes and future design and development and for device specifications. Additionally, recording the operating time can distinguish or differentiate different field failure modes. If the driver stores the temperature and time data on board, small EEPROM memory can be used to efficiently store the data.

Figure 10:
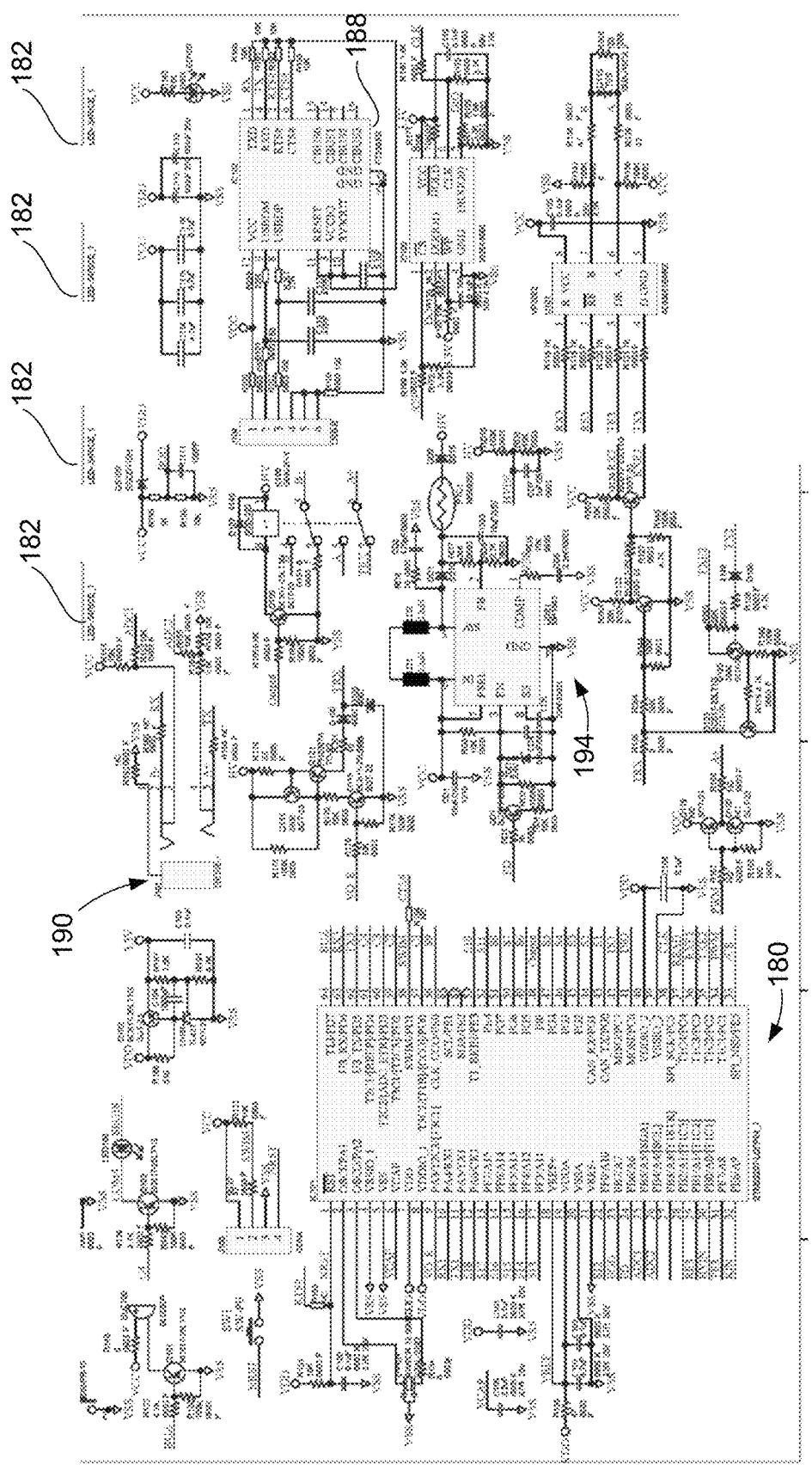
FIG. 10 is an electrical schematic of a microprocessor and electronics for a device such as that shown in FIG. 7.

In one example, the driver processor such as may be used to process the temperature and time or other data may be one such as that illustrated and described in FIG. 10, a STM8S207-LQFP64_1. In one configuration, TXD_Out may be coupled to pin 62, and RXD_In may be coupled to pin 63.

One or more external devices can be used to set, adjust, change, configure, read from, write to, and/or program a driver, for example the drivers described herein. The external device can be as simple as a component, for example a passive resistor or other electrical components, described more fully herein in conjunction with FIG. 13, a setting or programming device such as setting device 150 (FIGS. 7-10), and/or a general-purpose device such as a computer, tablet, laptop, smart phone or other programmed device having an application or program for interfacing with the driver. The external device can be temporarily or permanently connected to the driver, such as with a wired connection or a wireless link.

In one example of an external device, setting device 150 includes, optionally, control inputs such as switches 7, indicators 5 and/or a display 6. The setting device may also include input/output components, such as a mini USB connector 3 and/or a 3.5 mm phone jack 4 or other interface. USB connector can be used for communications with other devices, for example to program, configure or otherwise control the setting device, and in the present example to provide external power to the setting device. Alternatively, or additionally, power can be supplied to the setting device through an internal power source such as a battery source. The mini USB connector 3 can be used to connect to another device, such as a computer or a power converter, to power the external setting device 150, and so that the setting device 150 can also be used to provide power to a driver, for example when the driver is being adjusted or configured in the factory or in the field and external power is not otherwise provided to the driver.

The phone jack 4 is also a serial device and also can be used to power components on the driver. The phone jack can accept output cables such as 152 (FIG. 8A) and 154 (FIG. 8B), each of which have dual pin connectors 152A and 154A, respectively.

The indicators 5 include, for example, LED indicators for indicating status of the external device. A power indicator indicates application of power to the device, a milliamp indicator mA indicates the external device 150 is operating in current mode for being coupled to a current mode driver, a voltage indicator V designating voltage mode for being coupled to a voltage mode driver, degrees Celsius for indicating temperature, and % for indicating a percentage or ratio. These indicators also specify the form or units of the display.

Switches 7 are pressure sensitive switches and can be used for a number of functions. In one example, they include increment and decrement buttons 156 and 158, a mode button 160, a read button 162 and a program or set button 164. The increment decrement buttons can be used to scroll through selections on the display, if any, increase or decrease a setting to be sent to the driver, for example a higher or lower current setting, for example in milliamps, and the like. The mode button 160 can be used to select a mode. The read button 162 can be used to query various components on the driver, and the program button 164 can be used to transmit to and save instructions on the driver.

The external device can also have other components and functions, including, for example, a reset button or component 2, an annunciator, and/or other elements.

The setting device 150 can be combined with a two-pronged connector to wire adapter 166 (FIG. 8C) for connecting to a driver having only wire inputs and outputs. The adapter includes sockets 168 for receiving one or the other of the connectors 152A and 154A, and wire clamps 170 for receiving wires from the driver. The setting device 150 can then be used with such drivers.

Figure 7:
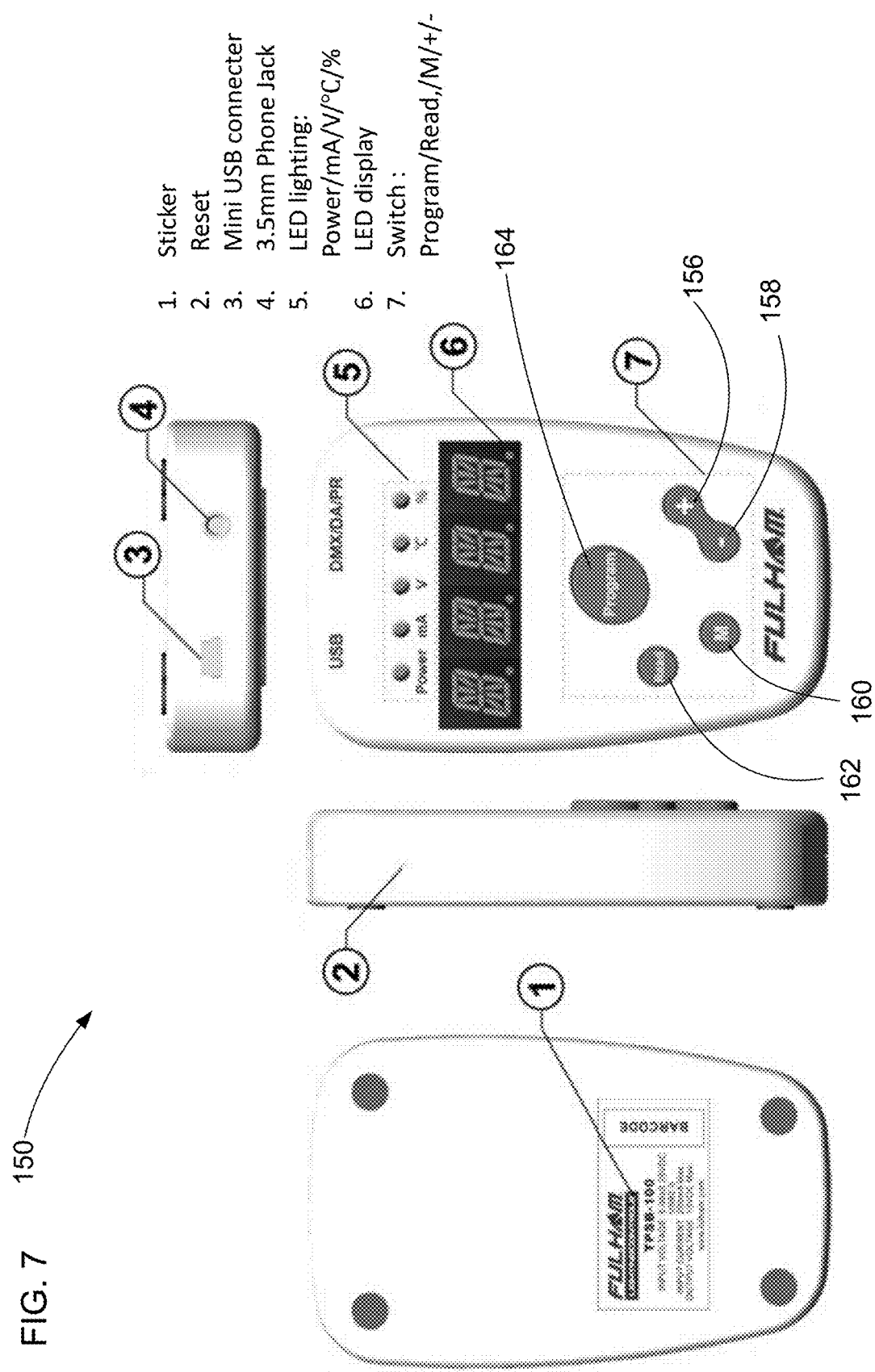
FIG. 7 are views of an external input or setting device for changing one or more parameters of an LED driver.

The setting device 150 can take a number of configurations. In one example, the setting device includes a microprocessor 180 (FIGS. 9 and 10 which controls a display 182, and receives input from keypad 184. The microprocessor also controls communication circuits 186, which may include a USB bridge 188 (FIG. 10), phone jack 190, and the like, exemplary ones of which are illustrated in FIG. 7. An adapter circuit 192 provides power to the microprocessor 180 and to boost circuits 194, and also to a driver 196 by way of the communication circuits 186.

In operation, the setting device is connected to a power source through a USB connector. The power source may be a computer, handheld electronic device, power adapter, charger or batter supply or other similar device. The setting device is then connected to the intended driver, for example driver 196, through one or the other of the cables 152 and 154. Current provided over the cable to the driver is sufficient to power one or more of the components on the driver, for example the processor, described more fully below, and various circuit components. Once connected and the digital components on the driver are powered, the setting device can query the driver microprocessor to determine various parameters and/or information. In one example, the setting device can request the current setting for output from the driver. In the example where the driver is a current mode driver, the setting device can request the present current output setting established in the driver. Where the driver is a voltage mode driver, the setting device can query the voltage setting on the driver. The setting device can also query temperature information, as well as other data. In some configurations, the setting device can also download data from memory or other components on the driver.

In some configurations of a setting device, the driver processor is reconfigured by first setting the desired current value to zero, at which time the R-SET function on the driver is active or enabled. If the current is set to a non-zero value, the R-SET function is disabled.

Where the setting device is to be used to set a parameter on the driver, for example the current output (ISET), the setting device is plugged into the RSET connector on the driver, and reads and displays the existing current setting on the driver, and if desired the total runtime (or in service time) when the user presses the read button 160. Where the driver is a constant current driver, the setting box will display ISET by default (a constant voltage driver will default to VSET). To change the setting, the user increases or decreases using the increment decrement buttons 156 and 158 to change the current setting. The display 6 shows the values entered by the switches 156/158. When the display shows the desired new current setting, the user presses the program button 164, and the setting device sends a digital signal representing the new current setting to the driver. The driver will then acknowledge the instruction and return with the new current setting as saved. The new current setting is displayed on the display 6, and the user can confirm that the new current has been properly set.

In one configuration of the setting device, the setting device can be used to quickly set or program a series of drivers sequentially. This process may be useful for quickly and easily configuring programmable drivers to set the desired output, for example output current or output voltage. In one configuration, the appropriate cable 152 or 154 is coupled to the phone jack, and the desired settings applied to the setting device. The two pin connector is then touched to the corresponding connector on the driver until confirmation of the new setting is received in the setting device, for example on the display or by an audible sound. For example, new settings can be established by touching the setting device connector to the corresponding connector on the driver sufficient to make electrical contact, but without fully inserting or fully seating or fully mating one connector with its mating connector. Sequential settings can be made without pressing the program or other equivalent button for each application of the cable. The time taken to power the appropriate circuits on the driver, transmit the desired setting, and receive information as to the new setting may take from 1-5 seconds, and typically less than 10 seconds.

The driver 102/196 may take a number of configurations. In one example (FIG. 11), a driver 200 can be a programmable dimmable driver having a connector 202 for receiving input power at a conventional voltage and current. The connector can also be configured to receive a dimming input, for example at pins 4-7 to be directed to Dim_In+ and Dim_In− pins in the driver circuit. The driver includes a rectifier circuit 204 and a power factor correction circuit 206 for providing the necessary output to an LED array (not shown). In the present example, the driver also includes additional protection and control circuits indicated generally at 210 (FIGS. 12 and 13), described more fully herein.

Figure 13:
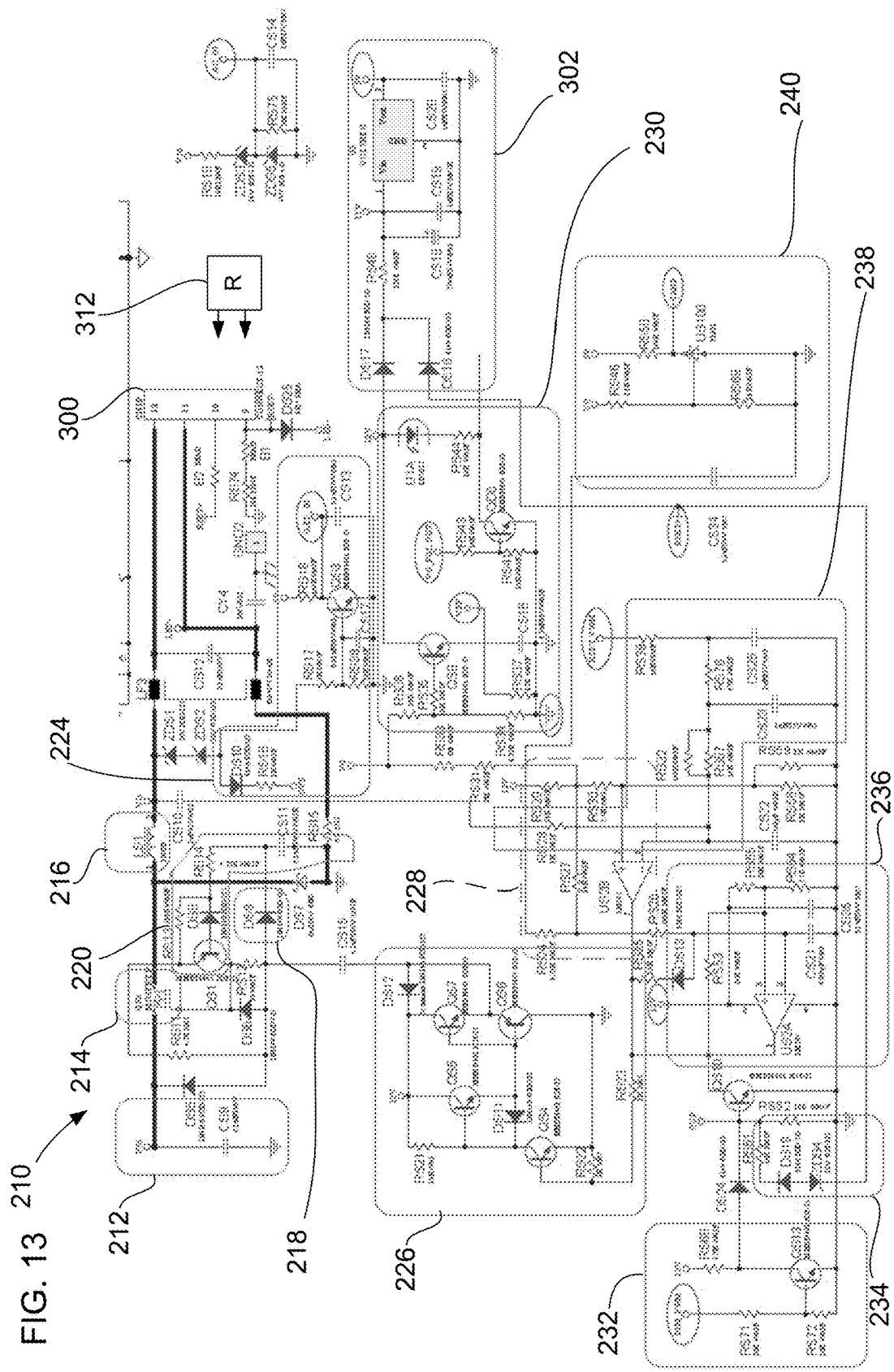
FIG. 13 is a functional diagram of the electrical schematic of FIG. 12.

Considering the additional circuits in more detail with respect to FIG. 13, the circuit receives power from the power factor correction circuit bus with the voltage corresponding to note V 70, indicated at 212. This is an input voltage for a DC-DC Buck circuit, varying according to load voltage, and ranging between 38-73 V. The higher the output voltage, the higher the V bus at V 70. This results in a higher efficiency because of the small differential between the V bus voltage and the output voltage.

The voltage is applied to a power switching MOSFET 214, which is applied in a highside Buck design. The MOSFET helps to control the maximum output voltage, and helps to extend the output voltage range with the load.

The voltage is applied to a power inductor 216 for the Buck structure. The inductor is configured to have a high power density, is a surface mount device and can support 60 W power conversion in continuous output current mode, with less core loss and less AC loss.

A diode 218 is included (DS 9) in part of a transistor QS1 to suppress ripple in the V bus. With the diode 218, the circuit, which may have a high ripple voltage on an electrolytic capacitor, can tolerate higher ripple voltage, allowing the electrolytic capacitor to be smaller and lower-cost.

The driver circuit also includes a soft start circuit 220. The soft start circuit 220 minimizes overshoot current when the power is on, thereby improving reliability.

The driver circuit also includes a voltage limiting circuit 222 (FIG. 20). The circuit 222 sets a maximum output voltage limit. In the present example, the maximum output voltage is set to 57 V, which complies with UL/CUL Class 2 voltage safety requirements.

A load detection circuit 224 (FIG. 13) monitors and detects the load condition on the circuit. The load detection circuit 224 along with the voltage limiting circuit 222 protect the driver circuit from abnormal loads. When there is no load or if the forward voltage of the load is too high, for example greater than 57 V, maximum, the diode US6 goes into conduction. The voltage OVP1 on RS35 and at RS16 (FIG. 13) drives transistor QS3 to conduct. Once QS 3 is conducting, ILED_In is pulled low, which the processor detects and produces an "abnormal load detection" signal, which may be sent to a further controller, for example a DALI controller. Current output may be reduced, or other actions taken.

The Buck circuit includes a lossless drive component 226 forming a highside MOSFET driver circuit.

A lag buck circuit 228 is also included in the driver circuit to help stabilize the current. The lag buck circuit is a simple design with a relatively fixed power inductor ripple current, which helps to prevent the occurrence of a discontinuous mode. The circuit also helps to minimize any flicker at deep dimming or low dimmer settings. The resisters RS23, RS24, RS27, RS28, RS29, RS30, RS56, RS59 and US2B form a light window comparator. When pin 7 of US2B is high, the window "high" level is set. When pin 7 of US2B is low, the window "low" level is set. The "high" and "low" values are determined by the resistor chain, unrelated to any output current value, even if there is a change in the output current. The window does not change. Likewise, the ripple current on the inductor, I-ripple does not change. The circuit does not enter into a discontinuous mode, and the frequency of the Buck circuits will be adjusted automatically. Additionally, when PWM dimming, described more fully below, the PWM controls the output of the Buck driver. When the PWM signal is low, the output of the Buck driver is forced "low", while it is noted that US2B pin 7 is actually output high but becomes low due to external circuits, and the LED load is off. When PWM is high, US2B pin 7 is released (in other words there is no force to pull it low). At this time, the PWM control signal is synchronized with the frequency of the Buck circuits automatically. This helps to eliminate any nonconformity between the Buck frequency and the dimming signal when in the PWM dimming mode, which would otherwise result in some flicker.

The driver circuit also includes a load voltage detection and V bus control circuit 230. This circuit adjusts the V bus according to the value of the sensed load voltage, Vo. A value proportional to Vo is fed to the VFF port, and the processor detects its value and outputs the corresponding duty cycle. The higher the VFF, the larger is the U1A duty cycle. The signal is isolating only transferred to the primary circuit through an optical coupler U1A, and when U1B in the power factor correction circuit 206 (FIG. 11) receives the signal from U1A, it will be processed by a linear filter of R8 and C3. The larger duty cycle of U1A, the lower the voltage on C3, and the smaller of the R6 bias current and the higher the output voltage of the Flyback output. The reverse occurs in the opposite direction. For example, if the load voltage goes lower, then the bus is adjusted lower, which results in a small voltage drop between the input and the output of the Buck circuit. This also helps the Buck operating frequency by reducing the magnitude of its possible variation, allowing the Buck inductor design to be simplified and increasing the system efficiency.

For a dimming-capable driver, a dimming and light turn off circuit 232 is provided using PWM dimming and also provides dimming the light to "off". When a very low dimming level is entered by the user, as indicated by dimming signals on the driver connector, the circuit transfers or shifts from analog dimming mode to a PWM dimming mode. This expands or widens the dimming range down to approximately 1 mA output current. The frequency of the Buck circuit is synchronized with the PWM dimming circuit and minimizes flicker at the very low dimming level.

Dimming is carried out under the control of the processor, which determines the transition from analog dimming to PWM dimming and back. The transition is determined according to duty cycle equations for analog dimming and PWM dimming. For analog dimming, $$Dutylinear := \frac{1050 - \left(\frac{Vd - 0.4}{4.2}\right) \times Iset}{1050 - 250}. \qquad \text{Eq. 1}$$

Accordingly, the duty cycle for analog dimming is calculated using Vd, the dimming voltage from the microprocessor, ISET is the setting current, and when "Dutylinear" is greater than 1, "Dutylinear" is set to 1. When "Dutylinear" is less than 1, "Dutylinear" is set to the calculated value. For PWM dimming, $$DutyPWM := \frac{\left(\frac{Vd - 0.4}{4.2}\right) \times Iset}{250} \qquad \text{Eq. 2}$$

The duty cycle for PWM dimming is calculated using Vd, the dimming voltage from the microprocessor, ISET is the setting current, and when "DutyPWM" is greater than 1, "DutyPWM" is set to 1. When "DutyPWM" is less than 1, "DutyPWM" is set to the calculated value. In the present configuration, the changeover is configured to occur at about 250 mA. Under this routine of the two equations, the dimming process follows the equations, and analog dimming switching to PWM dimming is seamless, with little or no instability during any transition and no flicker. If ISET is different, the switching point is different.

A connection protection circuit 234 is included for protecting against incorrect connections and wrong output. The circuit 234 automatically decreases an output voltage when the output wire is connected to the control wire by mistake, thereby enhancing the safety of the circuit.

A no load protection circuit 236 is included in the driver to protect the circuit in case of a no load condition. The circuit 236 decreases the Buck frequency down to a few thousand Hertz, reducing any standby power loss.

An analog dimming circuit 238 provides dimming over a relatively wide range and adjusts the output current. The analog dimming circuit 238 receives a control signal with a varying duty-cycle from the microprocessor, and adjusts the output current accordingly. The analog dimming circuit 238 can carry out both analog dimming and output current setting functions. The output current can be changed.

The driver circuit also includes an abnormal output voltage protection circuit 240. The protection circuit 240 is triggered if the output voltage exceeds 60 V. The microprocessor detects the excursion by a signal from the protection circuit 240 and turns off the power MOSFET 214. The microprocessor also control the primary circuits to decrease V bus, to improve the safety of the output voltage.

The driver circuit provides a wide output range, for example 10-57 V, and also a wide output power range, such as 2.5 W-60 W. As a result, the driver circuit is compatible with a wider range of LED fixtures. Additionally, the driver circuit can have a wide range of output current settings, for example 250-1050 mA, which can be adjusted in 1 mA steps. The output current settings can be configured or set with something as simple as manually with an external resistor, or digitally using an external configuration/transfer device, computer or other interface device.

Figure 15:
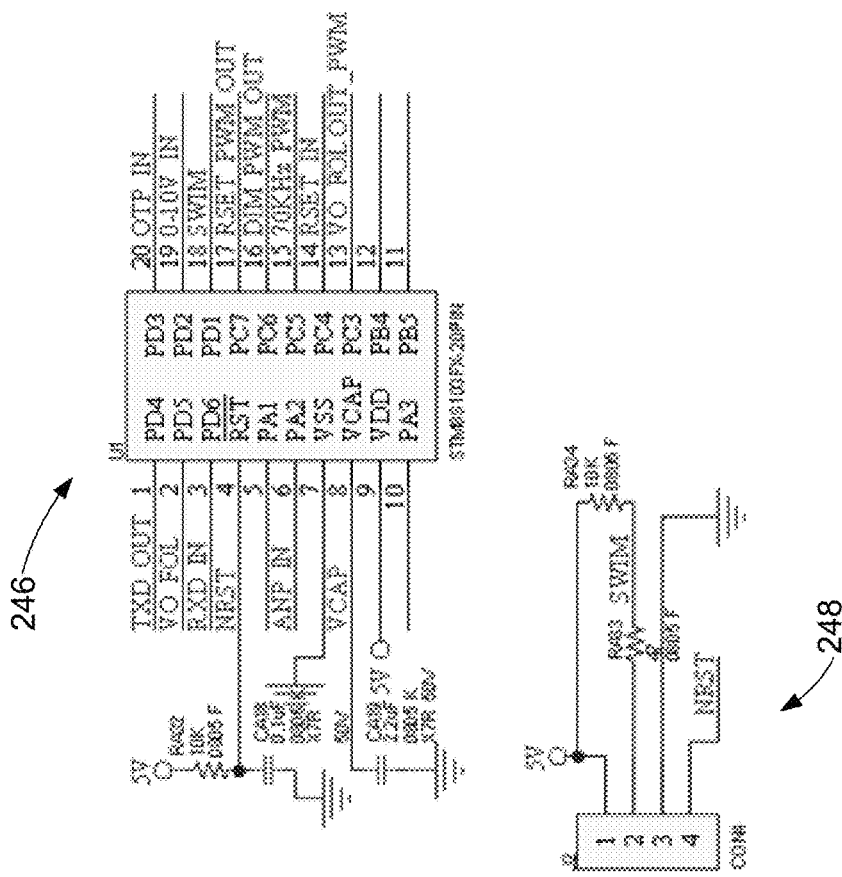
FIG. 15 is an electrical schematic of an exemplary processor for use in the circuits of FIGS. 11 and 12, along with a connector and associated circuit.
Figure 14:
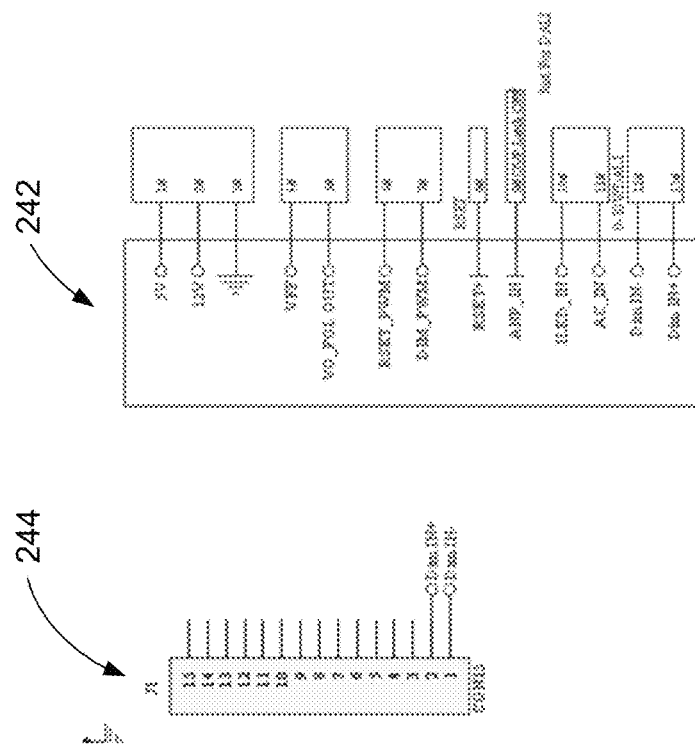
FIG. 14 is a schematic and functional diagram of a junction connector and pin assignments for a processor for use in the circuits of FIGS. 11 and 12.

Pin and connector assignments for one configuration of processor are illustrated at 242 and 244 (FIG. 14) corresponding to a processor configuration such as 246 shown in FIG. 15. The microprocessor is one that can be used in the present configurations, but additional memory capacity is beneficial. A connector 248 for a reset and interface module is also shown in FIG. 15.

Figure 11:
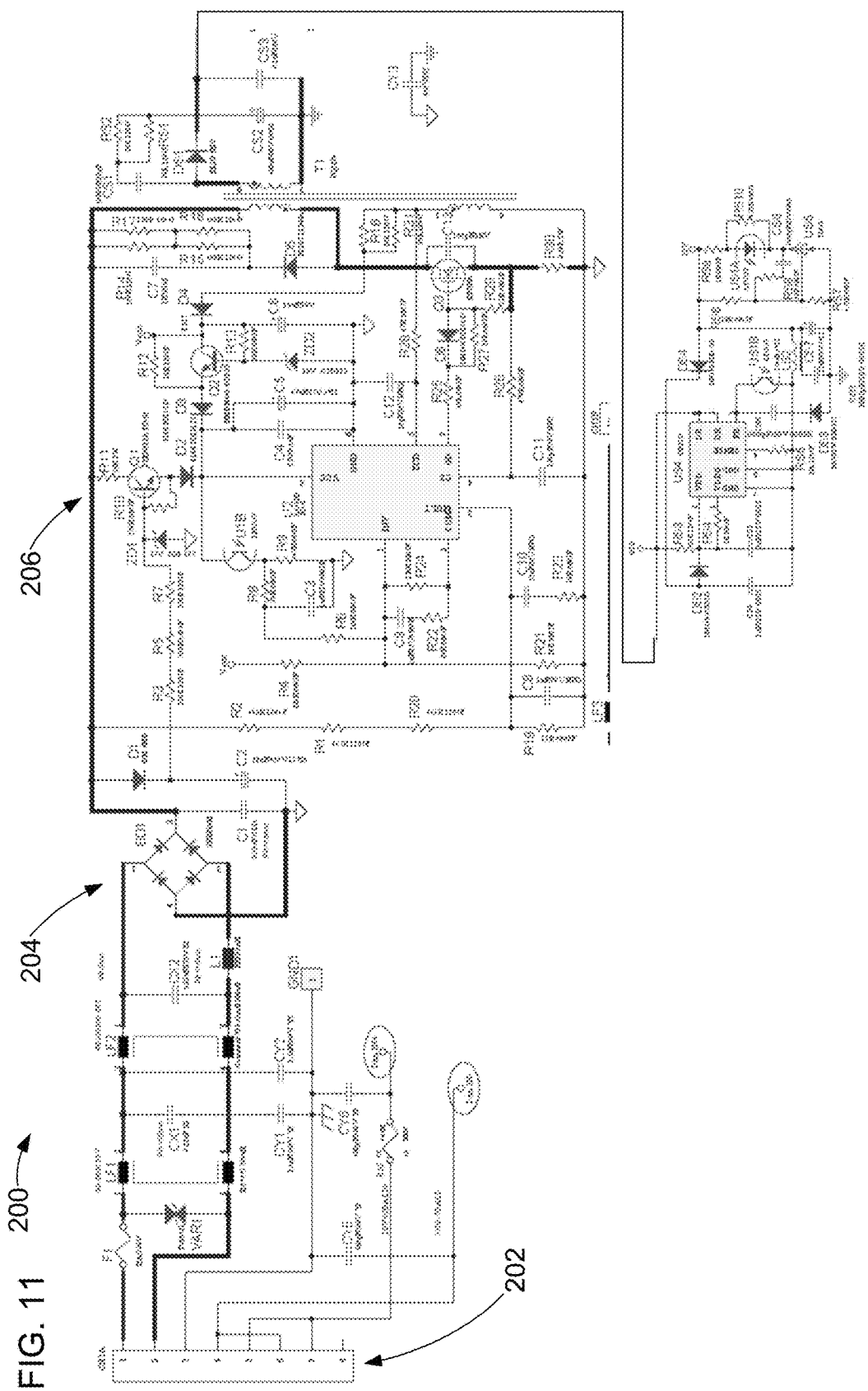
FIG. 11 is an electrical schematic of an input circuit and a power factor correction circuit for a driver that can be used with the inventions discussed herein.
Figure 12:
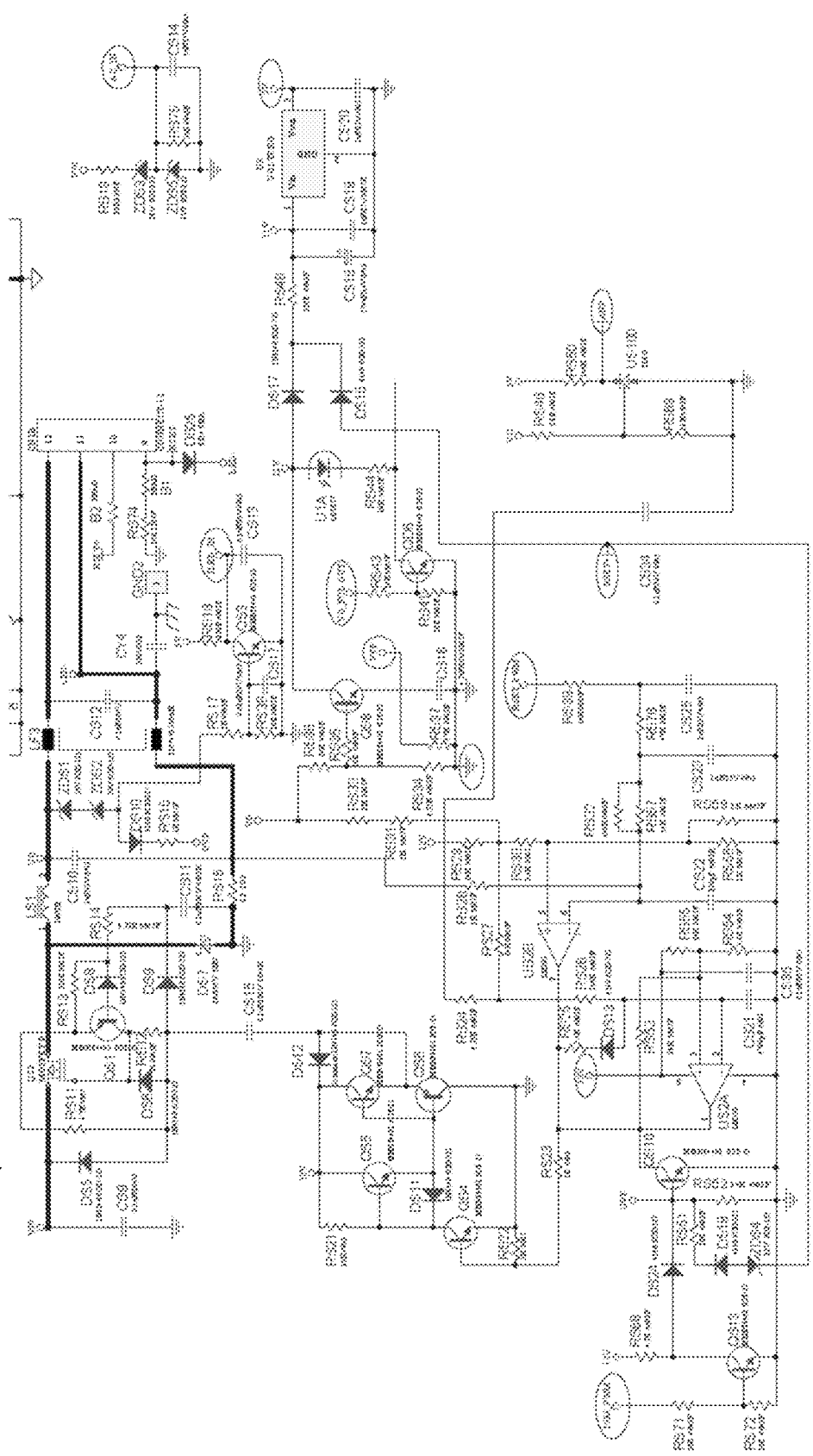
FIG. 12 is an electrical schematic of DC-DC Buck and dimming circuits for use in the inventions described herein.

A connector 250 is shown in FIG. 16, and functional pin assignments are shown in FIGS. 17-18 for a configuration of connections between a motherboard and a daughter board. The sources of the signals to the microprocessor are shown on the left side of the interface of FIG. 18. Pin 6 includes the proportional voltage value VFF, and pin 7 provides a signal for controlling the buck circuit. Pin 8 provides a signal from the processor allowing the output current to be set. Pins 16 and 17 receive the analog dimming input signals from the external connector 202 (FIG. 11).

Figure 19:
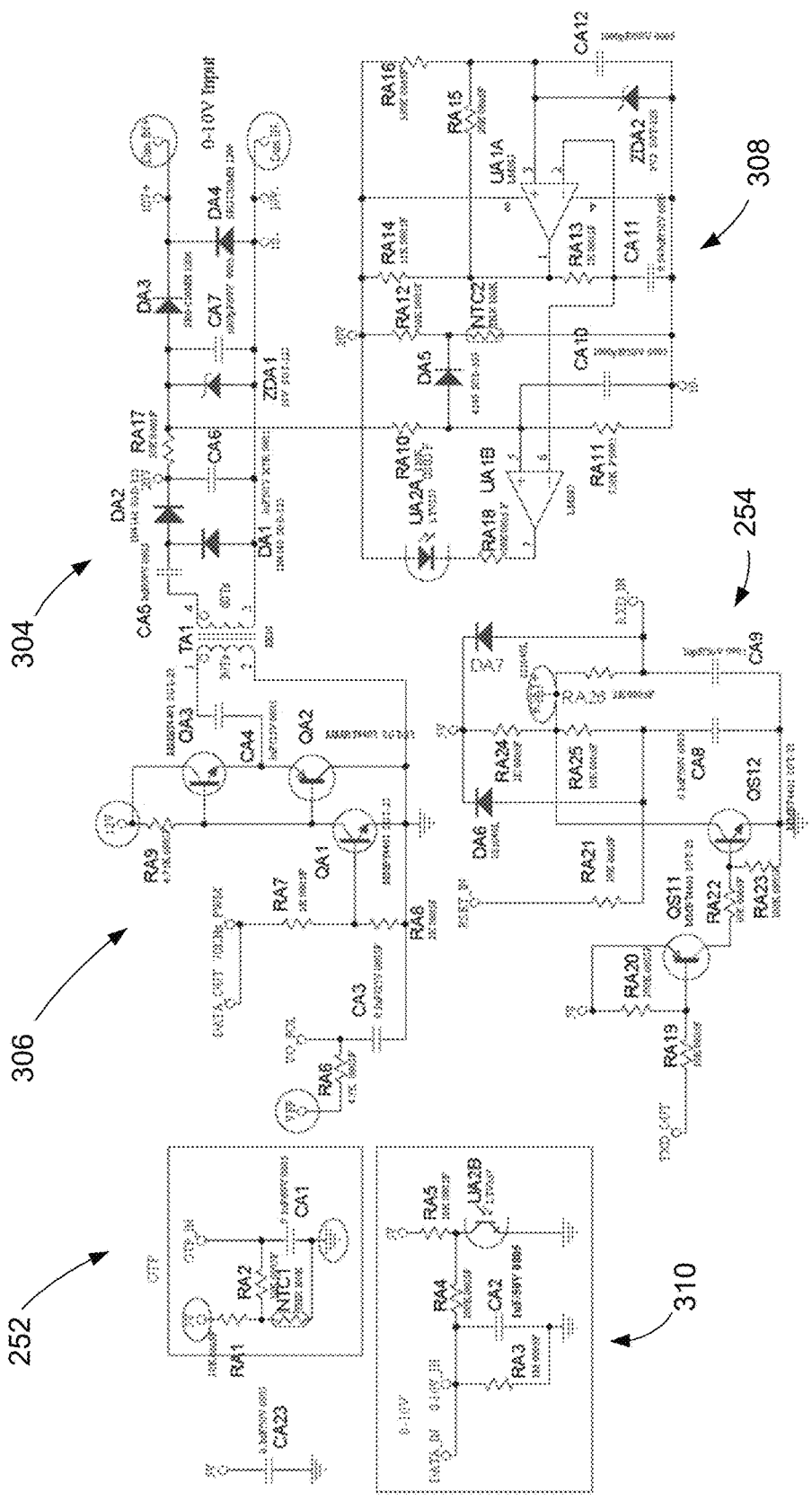
FIG. 19 are electrical schematics of circuits for use with the electronics of FIGS. 11 and 12.

Another configuration of an overtemperature protection circuit 252 (FIG. 19) is coupled in the low-voltage circuit in a voltage divider configuration, and provides an output to the processor, for example pin 20 in the processor 246 in FIG. 15. In the present example, the sensor is a thermistor of a negative temperature coefficient configuration. Other temperature sensors are also possible.

The driver circuit also includes an interface circuit 254 to allow an external device, such as the setting box 150, to access and make changes to the processor or registers or other components in the driver. In one configuration, when the driver is assembled, it can be set for having a fixed output, for example a fixed current output, without allowing any changes to be made to the circuit, for example to modify the current output. In another configuration, the RSET configuration in the processor can be activated at the factory, to permit later adjustments, configuration changes or for other purposes, by making changes in the field. New settings, configuration changes or adjustments can be made using a digital electronic device, for example the setting box 150, coupled to the driver either temporarily or for a longer period of time. The interface circuit 254 includes an RSET_IN node that applies a signal to pins 14 of the processor 246 (FIG. 15). This connection allows the processor to determine whether or not a signal, such as the setting device 150, is present, thereby allowing settings or other driver configurations to be changed by the setting device. For example, the maximum output current can be changed by the setting device by applying, in part, a signal to the interface circuit 254.

Figure 8A:
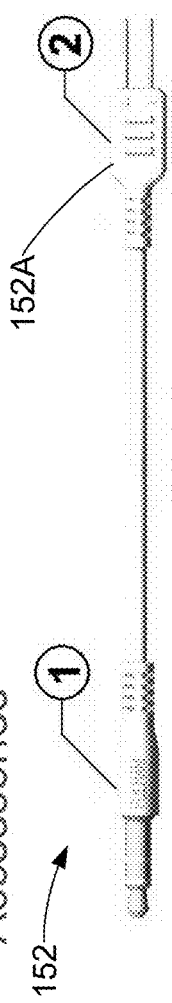
FIG. 8A is a plan view of an output cable for the device of FIG. 7.
Figure 8B:
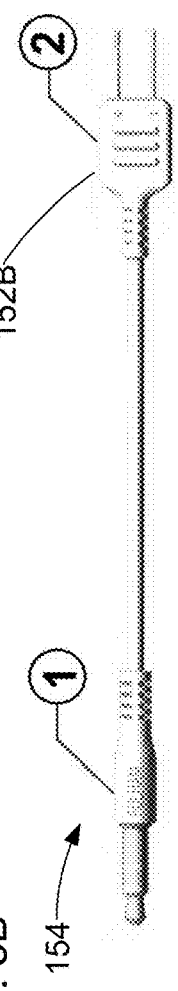
FIG. 8B is a plan view of a further configuration of an output cable for the device of FIG. 7.
Figure 8C:
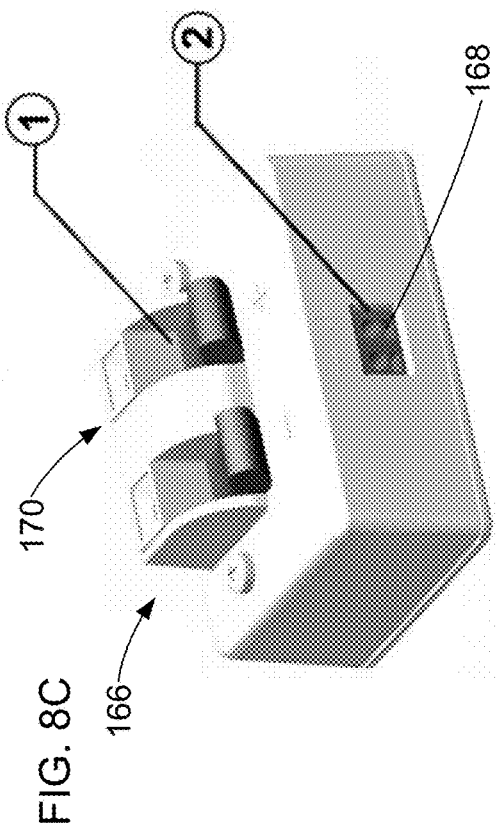
FIG. 8C is an isometric view of an adapter for receiving a driver connection from an external device and for coupling the driver connection to wire connections for a driver.
Figure 9:
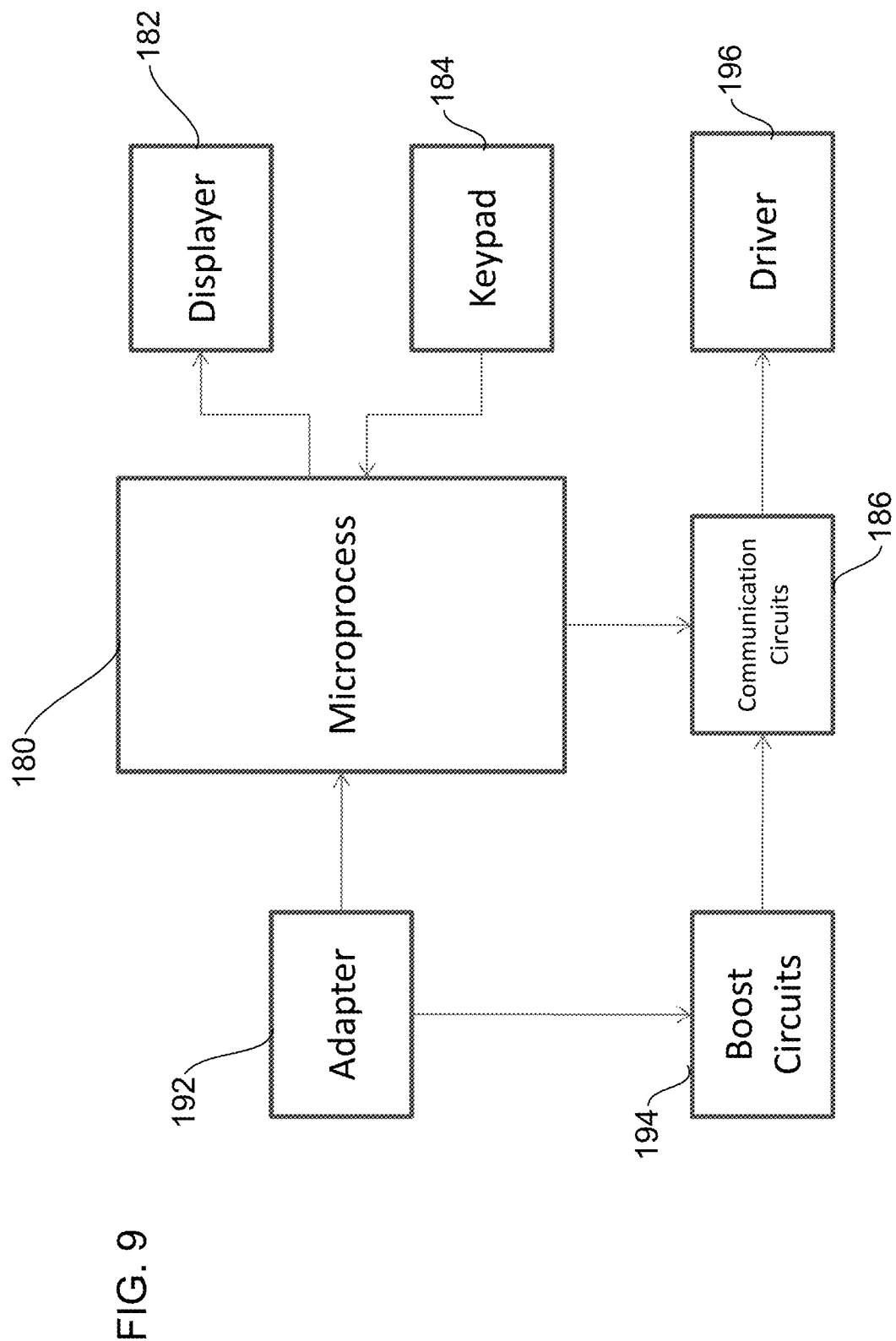
FIG. 9 is a schematic and block diagram of a device such as that shown in FIG. 7.

In the present configuration, the driver includes a connector 300 (FIG. 13) for providing LED output (pins 11 and 12) and for receiving an electrical connection from the setting device 150, or other external device. In the present example, the pins 9-10 in the connector receive the two pin connector 152A or 154A of the setting box cables (FIGS. 8A-B). The RSET+ node is coupled to pin 10 which corresponds to a connection between the diodes in the circuit 234 (FIG. 13) and the diodes in a voltage regulator circuit 302, described more fully below. RSET− is coupled to ground through resistors.

When the setting device 150 applies a signal to RSET+, the signal is applied through the interface circuit 254 to the microprocessor through the RSET_IN input, corresponding to pin 14. The incoming digital signal from the setting box 150 provides digital data to configure the microprocessor for the desired setting for current output. Other configurations may be used to provide digital signals to the microprocessor for the desired purpose.

The setting box 150, or other external device, is coupled to the driver through the connector 300 when the driver is not otherwise being powered. Consequently, no high voltage is present on the circuit, whether 20 V, 12 V, anything greater than 10 V, or otherwise. The setting box 150, or other external device, applies a signal to the driver sufficient to provide power to enable changing or reconfiguring one or more aspects of the processor, registers, or other storage devices as desired. Specifically, the incoming signal from the setting box provides current through the node RSET+ through the diode DS16 in the voltage regulator circuit 302 to the voltage regulator circuit U3. The voltage regulator provides approximately 5 V at the output, there being no other voltage in the system. That voltage is sufficient to power the processor, and the data signal from the setting box can be received and applied to the processor through the interface circuit 254. The incoming data signal from the setting device is applied to the microprocessor through RXD_IN, corresponding to pin 3. With this configuration, the setting device can not only power the necessary circuit for making configuration changes in the driver, the setting device can apply the changes to reconfigure the driver.

In addition to or as an alternative to adjusting or changing the driver configuration, the output current can be changed with a physical device coupled to the driver, for example a passive resistor connected to the driver during normal operation. In one example, a resistance 312 can be coupled to the connector 300 through pins 9-10. Once the circuit is powered up for normal operation, the circuit at RSET+ changes the resistance arrangement in the interface circuit 254, and changes the voltage in the circuit specifically, the resistance at the node between RA24 and RA25 is changed, which difference is sensed by the processor at RSET_IN. The resistance 312 is selected according to the desired current output. Each different resistance can be labeled to allow the user to determine which resistance is to be used for their desired current output. Each resistor can be labeled according to the desired current in milliamps, or each resistor could be identified according to its ohm value, and the user can choose the appropriate resistor based on a current versus resistance curve.

As described herein, the driver is configured so that it has settings for circuit configurations changed in one method, for example where no power or where high voltage is applied to the driver and the configuration is changed by connecting a resistor into the driver, and changed in another method, for example where a second power is applied to the driver different from the power normally applied for normal operation, and one or more circuit configurations are changed, for example by an external setting device. This allows greater flexibility in designing, configuring and using LED drivers.

In a driver that has dimming circuits, the dimming controls are applied to the driver through the Dim IN+/− inputs, for example on the connector 202 (FIG. 11). In the present example, the inverter includes a dimming input circuit 304 (FIG. 19), which is a form of an internal isolated power generation, for receiving the analog dimming input signals from a dimming control device. The dimming input circuit chain power supply 306 that can produce a well-regulated 12 V to an isolation transformer TA1 and to the input of the dimming input circuit. The higher voltage signal is applied to a conversion circuit 308 which takes the incoming analog dimming signal and converts it to digital, with temperature compensation by changing the gain of the UA1A amplifier, and applies the signal to the data input to the microprocessor through UA2B in the data input circuit 310.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. An LED driver circuit comprising:
   an input circuit for receiving rectified current;
   an output circuit for driving an LED component;
   a dimming input for receiving a control signal for adjusting an output at the output circuit for dimming an LED component; and
   a sensing circuit for sensing when the control signal for adjusting the output reaches a first value, wherein the sensing circuit is configured to output a switching signal to switch between a pulse width modulation dimming of the LED component and an analog dimming of the LED component when the control signal reaches the first value to expand an output current dimming range of the LED driver circuit.

2. The driver circuit of claim 1 further including a pulse width modulation dimming circuit coupled to the sensing circuit to provide the pulse width modulation dimming of the LED component and an analog dimming circuit coupled to the sensing circuit to provide the analog dimming of the LED component, wherein the pulse width modulation dimming circuit and analog dimming circuit are separate dimming circuits.

3. The driver circuit of claim 2 wherein the LED driver circuit includes a buck circuit operating at a first frequency, wherein the pulse width modulation dimming circuit operates at a second frequency substantially equal to the first frequency.

4. The driver circuit of claim 1 wherein the sensing circuit includes a transistor.

* * * * *